(12) United States Patent
Warner et al.

(10) Patent No.: US 8,611,218 B2
(45) Date of Patent: Dec. 17, 2013

(54) VARIABLE PHY MARGIN TO COMBAT INGRESS NOISE

(75) Inventors: Edward Warner, San Diego, CA (US); Robert Popoli, Rancho Palos Verdes, CA (US)

(73) Assignees: Entropic Communications, Inc., San Diego, CA (US); DIRECTV Group, Inc., San Diego, CA (US)

( * ) Notice: Subject to any disclaimer, the term of this patent is extended or adjusted under 35 U.S.C. 154(b) by 316 days.

(21) Appl. No.: 12/612,994

(22) Filed: Nov. 5, 2009

(65) Prior Publication Data

US 2010/0111147 A1    May 6, 2010

Related U.S. Application Data

(60) Provisional application No. 61/111,671, filed on Nov. 5, 2008, provisional application No. 61/121,157, filed on Dec. 9, 2008.

(51) Int. Cl.
*H04L 1/00* (2006.01)

(52) U.S. Cl.
USPC ............ 370/235; 370/260; 375/220; 375/285

(58) Field of Classification Search
None
See application file for complete search history.

(56) References Cited

U.S. PATENT DOCUMENTS

| | | | |
|---|---|---|---|
| 6,308,080 B1 | 10/2001 | Burt et al. | |
| 2006/0203713 A1* | 9/2006 | Laroia et al. | 370/209 |
| 2006/0292988 A1* | 12/2006 | Yuen et al. | 455/62 |
| 2010/0232452 A1* | 9/2010 | Takagi et al. | 370/445 |

* cited by examiner

*Primary Examiner* — Kibrom T Hailu
*Assistant Examiner* — Zewdu A Beyen
(74) *Attorney, Agent, or Firm* — Bruce Greenhaus; Richard Bachand (57) ABSTRACT

A method includes determining a first aggregate received power level of an orthogonal frequency division multiplexed (OFDM) signal received at a first network node, adjusting a nominal PHY Margin an amount that is dependent upon a measurement of an aggregate received power level of the OFDM signal, determining a data transmission rate based on the adjusted nominal PHY Margin, and receiving data being transmitted in accordance with the data transmission rate at the first node.

23 Claims, 7 Drawing Sheets

VARIABLE PHY MARGIN TO COMBAT INGRESS NOISE

CROSS-REFERENCE TO RELATED APPLICATIONS

This application claims the benefit of U.S. Provisional Application No. 61/111,671 filed Nov. 5, 2008, and this application claims the benefit of U.S. Provisional Application No. 61/121,157 filed Dec. 9, 2008.

FIELD OF DISCLOSURE

The disclosed system and methods relate to communication systems. More specifically, the disclosed system and method relate to adjusting a Physical Layer (PHY) Margin to minimize the effects of noise.

BACKGROUND

Household and business appliances emit sporadic bursts of energy at various frequencies. These sporadic emissions are seen as noise to signals being transmitted by network devices. To combat the effects of such noise, some conventional communication systems add a "PHY Margin" to the data transmission rate/power requirements of the signals transmitted. Throughout this discussion, the term "data transmission rate" means the amount of useful information that can be transmitted from the transmitting device to the receiving device. For the purposes of this discussion, useful information does not include error correction bits. In one instance, the PHY Margin is an increase in the amount of power (and so signal to noise ratio) that would otherwise be required to transmit the same amount of information over the communication channel with a fixed error rate. Alternatively, the PHY Margin is provided by decrease in the data transmission rate. In Quadrature Amplitude Modulation (QAM) modulation scheme, a decrease in the data transmission rate means a decrease in the density of the symbol constellation (i.e., the number of unique states that can be represented by one QAM symbol). Thus, the addition of a PHY Margin increases the reliability with which information can be transmitted over the communication channel in the face of noise. Typically, these PHY Margins are added to every signal transmitted through the communication medium.

However, each network and environment is different. Some environments will be noisier than others. Some communication networks are more susceptible to noise than others. Nonetheless, conventional communication systems are not typically equipped to adapt to changes in noise conditions. Increasing the PHY Margin consistently in response to sporadic noise can cause a reduction in the data throughput (e.g., when the transmitter is at maximum transmission power, the only way to increase the PHY Margin is to reduce the data transmission rate, which in some instances includes providing a more robust error correction scheme).

Accordingly, it is desirable to develop a mechanism for communicating more efficiently in a sporadic noise environment.

SUMMARY

In some embodiments, the disclosed method includes determining a power level, such as an aggregate received power level (ARPL) of a signal, such as an orthogonal frequency division multiplexed (OFDM) signal received at a first network node. An "Additional Physical Layer Margin" (APHYM) is determined based upon the ARPL. Application of the APHYM to a previously determined "nominal" PHY Margin results in an adjusted PHY Margin. In some embodiments of the disclosed method and apparatus, the PHY Margin is essentially an additional amount of signal to noise ratio (SNR) on a channel over that which is required to transmit data at a particular data transmission rate without exceeding a fixed error rate. In accordance with the disclosed method and apparatus, the data transmission rate to be used is determined based upon ARPL, a measurement of the SNR of the channel and adjustments to the PHY Margin based on the ARPL. Data is then transmitted to the first node in accordance with the data transmission rate.

In some embodiments, the first network node receives orthogonal frequency division multiplexed (OFDM) signals. The node includes a processor that determines the power level of each subcarrier of an OFDM signal received at the node. The processor adjusts the PHY Margin of each subcarrier of the OFDM signal based on the level of that subcarrier to provide a "Subcarrier Added Physical Layer Margin" (SAPM) which may be done as an alternative or in addition to the adjustment made to the nominal PHY Margin by the APHYM.

DETAILED DESCRIPTION

The disclosed system and method provides protection from noise, including sporadic noise, that might otherwise interfere with data being transmitted between network nodes. To transmit data at a particular data transmission rate and with a particular error rate, the signal used to transmit the information must have a particular signal to noise ratio (SNR). Accordingly, the data transmission rate, error rate and SNR are interrelated. Ideally, one could determine the exact SNR necessary to achieve a particular data transmission rate and an error rate that would result from transmitting at that data transmission rate. It should be understood that an increase in the robustness of an error correction scheme can also decrease the error rate with a fixed SNR, but will typically come at the cost of a decrease in the data transmission rate. In order to ensure that the desired error rate is not exceeded, a concept called "PHY Margin" is used to add a margin of "safety" to the relationship between the desired SNR and data transmission rate. Increasing the PHY Margin generally means that for a particular SNR the data transmission rate must be decreased. If the SNR goes down (due to a reduction in the transmit power, an increase in the amount of noise in the channel or an increase in the attenuation presented to the signal by the channel), then the data transmission rate must also go down in order to maintain the PHY Margin. Alternatively, the SNR can be increased by increasing the transmit power and maintaining the same data transmission rate. Still further, a combination of an increase in the transmit power (and thus the SNR) and a decreasing the data transmission rate can be provided to increase the PHY Margin. Still further, a more robust error correction scheme can be implemented, either alone or in combination with a change in one of the other parameters (i.e., increased transmit power or decreased data transmission rate). As noted above, use of a more robust error correction scheme typically will require a reduction in the efficiency of the channel and thus a reduction in the data transmission rate.

In one embodiment of the disclosed method and apparatus, a data transmission channel between two communicating nodes is characterized by sending a probe from a first node to a second node. The probe includes known data. The data is received and processed by the receiving node. Some of the characteristics that are determined by the characterization of the channels include the received power level (such as an aggregate received power level (ARPL)) of signals received from each particular transmitting node when that node transmits at a prescribed transmit power level. Alternatively or additionally, a received signal strength indicator (RSSI) value is determined from the received probe. In addition, the probe can be used to determine the SNR of the channel at a particular transmit power level. In an alternative embodiment, the power level and SNR of the received signal can be measured in any manner that provides a reasonably accurate measure of the received power.

In accordance with one embodiment of the disclosed method and apparatus, the ARPL and/or RSSI are used to determine whether an additional PHY Margin (APHYM) is to be used and how large the APHYM should be. That is, when the received signal has a relatively low strength, there is a greater probability that sporadic noise will temporarily lower the SNR enough to undesirably increase the error rate. By adding APHYM to adjust the nominal PHY Margin, some measure of security can be attained that the information will be received with an error rate no greater than the desired error rate. Accordingly, depending upon the ARPL and/or RSSI, an APHYM is added to the nominal PHY Margin. For the purposes of this disclosure, the "nominal PHY Margin" is that margin which would otherwise have been desirable to use when transmitting subsequent information from the first to the second node.

In one particular embodiment, the APHYM is applied equally to each of the subcarriers of an orthogonal frequency division multiplexed (OFDM) signal having a plurality of subcarriers that are subsequently transmitted from the first to the second node. Alternatively, or additionally, a Subcarrier Added PHY Margin (SAPM) may be added to the PHY Margin used with one or more of the subcarriers of a subsequently transmitted OFDM signal on a subcarrier by subcarrier basis. In one embodiment, the APHYM and SAPM are used to calculate an index value from the magnitude of the SNR required of the received signal in order to receive data at particular data transmission rates at a predetermined error rate.

In an alternative embodiment, the APHYM and SAPM are adjustments to the data transmission rate at which the data is transmitted through the communication medium at a fixed error rate. In yet another alternative embodiment, the APHYM and SAPM take the form of an adjustment to the amount of power required to transmit data at a fixed data transmission rate with a fixed error rate (which is an attempt to increase the SNR of the received signal). In one such embodiment, the power level is communicated to the transmitting node. The power level can be communicated either directly or through a network controller or network coordinator. Furthermore, the receiving node can indicate power level of the transmission or an amount above the power level used to transmit the probe. There are several ways in which the receiving node can communicate that the power level of the transmitting node should be increased in order to result in a higher SNR at the receiving node, and thus increase the PHY Margin. In yet another embodiment, an error correction scheme can be made more robust in order to reduce the error rate for the same SNR.

It should be noted that the disclosed method and apparatus differs from systems in which the power level of a received signal is measured and the receiver communicates with the transmitter to increase the power in order to achieve a desired SNR. The difference between such a system and the disclosed method and apparatus is that in the disclosed method and apparatus, the amount of PHY Margin that is desired will depend upon the level of the received signal. Therefore, the system will not attempt to maintain a constant SNR in order to transmit information at a particular data transmission rate. For signals that are received at relatively low levels, the SNR will be required to be greater than for signals that are received at higher signals levels. In yet another alternative, the APHYM and SAPM takes the form of a combination of an adjustment to the data transmission rate and to the power level of the signals being transmitted in order to ensure a minimum error rate. In one such embodiment, the data transmission rate is adjusted down only after the transmitter is requested to transmit the maximum power. In yet another embodiment, the robustness of the error correction scheme is also used to increase the PHY Margin and may be used in combination with increases in power and reductions in the amount of information sent within a fixed period of time. It should be understood that increasing the SNR only increases the PHY Margin if the data rate remains the same. If the SNR remains the same, then the PHY Margin is increased by reducing the data transmission rate.

Figure 1:
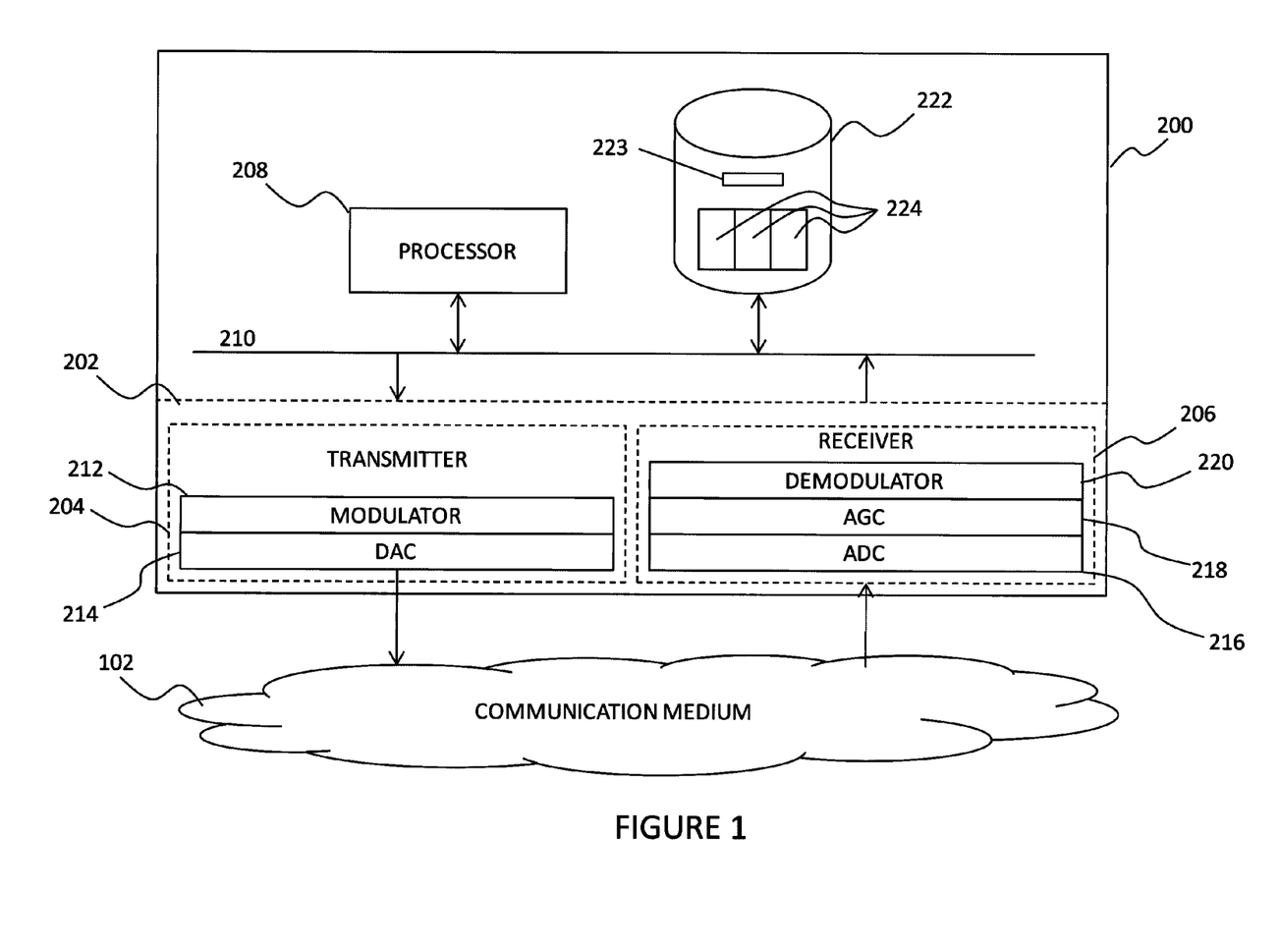
FIG. 1 is a block diagram of one example of a network node.

In one embodiment of the disclosed method and apparatus, a network node communicates with other nodes. The node can be a device within a home entertainment system, for example, a set top box (STB), television (TV), computer, DVD or Blu-ray player, gaming console, or the like. FIG. 1 illustrates one such node 200. The node 200 includes a transceiver 202. The transceiver 202 includes a transmitter 204 and a receiver 206. The transmitter 204 and receiver 206 communicate with a processor 208 through a data bus 210. In one embodiment, the transmitter 204 includes a modulator 212 for modulating data according to a quadrature amplitude modulation (QAM) scheme such as, for example, 8-QAM, 16-QAM, 32-QAM, 64-QAM, 128-QAM, or 256-QAM. The transmitter also includes a digital-to-analog converter (DAC) 214 for transmitting modulated signals to other network nodes 200.

In one embodiment, the receiver 206 includes an analog-to-digital converter (ADC) 216 for converting an analog modulated signal received from another network node 200 into a digital signal. In one such embodiment, the receiver 206 also includes an automatic gain control (AGC) circuit 218 for adjusting the gain of the receiver 206 to properly receive the incoming signal. The receiver further includes a demodulator 220 for demodulating the received signal. One skilled in the art will understand that the network node 200 may include additional circuitry and functional elements not described herein. In an alternative embodiment of the disclosed method and apparatus, the node 200 does not include all of the elements shown in FIG. 1. Such variations in the node 200 will be well understood by those skilled in the art and are not material to the disclosed method and apparatus for improving the performance of the node 200 in the presence of sporadic noise. These details are provided merely to give context to the disclosed method and apparatus.

The processor 208 may be any central processing unit (CPU), microprocessor, micro-controller, controller, device or circuit for executing instructions 223. Alternatively, the processor 208 is dedicated hardware, such as a state machine or other dedicated hardware circuit including, but not limited to, an array of logic gates, logic circuits, etc. In the embodiment shown in FIG. 1, the processor 208 is in communication with a memory device 222, such as a computer readable storage medium, through a data bus 210. In accordance with one embodiment of the disclosed method and apparatus, executable instructions 223 and look up tables (LUTs) 224 are stored in the memory device 222. Other information may also be stored in the memory device 222. In one embodiment, the memory device 222 is (or includes) a random access memory (RAM) and/or a more persistent memory, such as a read only memory (ROM). Those skilled in the art will recognize that there are a plethora of devices, too numerous to mention, that may be used to store information, such information including executable instructions 223 and related data (not shown) required for the operation of the processor 208.

Figure 2:
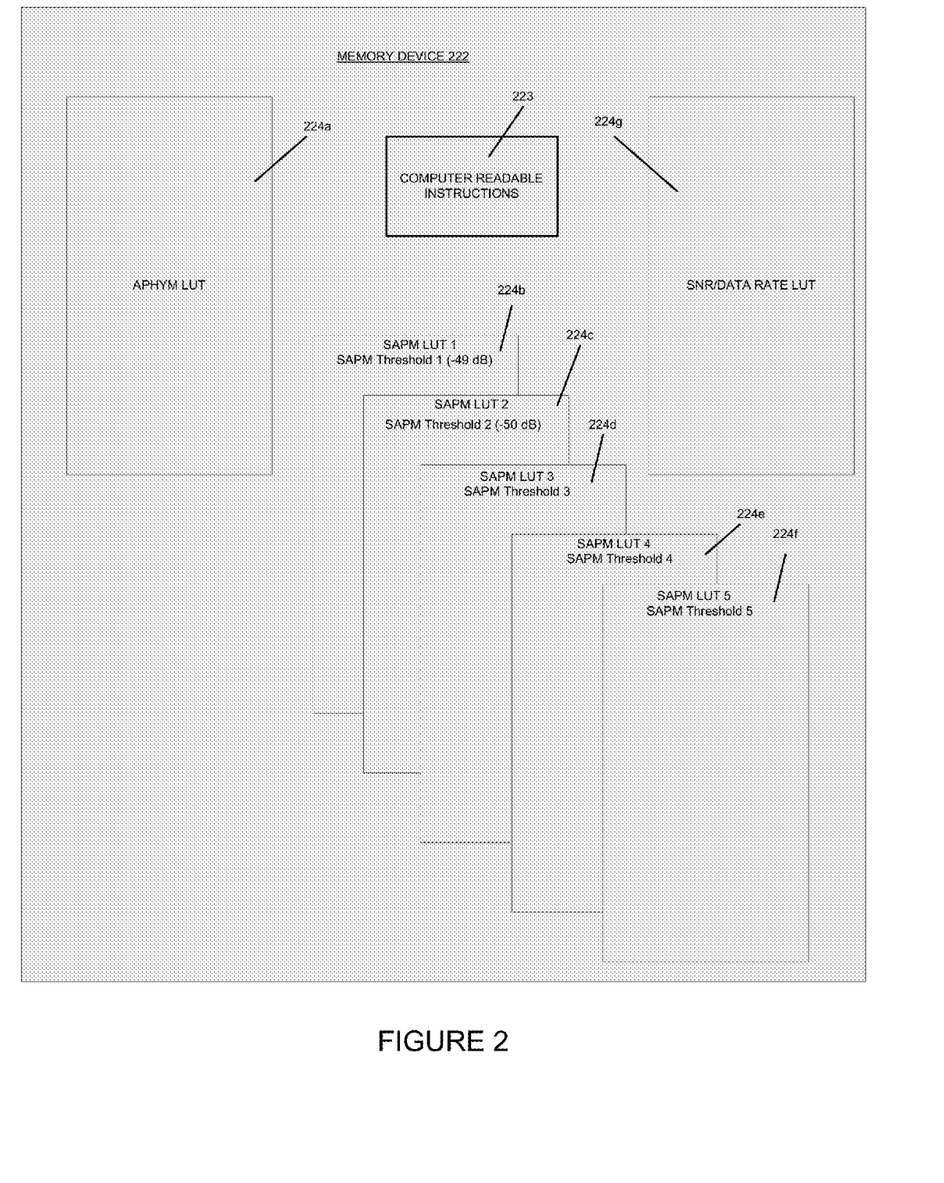
FIG. 2 is an illustration of some of the contents of a memory device in accordance with one embodiment of the disclosed method and apparatus.

As noted above, one or more LUTs 224 may be stored in the memory device 222. FIG. 2 is an illustration of some of the contents of the memory device 222. In one embodiment, one LUT 224 that is stored in the memory device 222 is an APHYM LUT 224a. The APHYM LUT 224a includes a plurality of APHYM values. Each value is associated with an aggregate received power level (ARPL) and/or a received signal strength indicator (RSSI) value. Table 1, below, is one example of an APHYM LUT 224a. In one embodiment, the APHYM values are be stored in steps of 0.5 dB, starting at 0 dB and going up to a maximum value of 30 dB. In alternative embodiments, other steps or increments as well as other maximum and minimum values are stored in the APHYM LUT 224a. As shown in Table 1, if the ARPL of a received probe is between 0 dB and −41 dB, inclusive, then an APHYM is not used to adjust the PHY Margin (e.g., APHYM=0 dB). However, an APHYM would be used to adjust the PHY Margin if the signal has an ARPL of −42 dB or below. For example, if a probe signal is received having an ARPL of −49 dB, then an APHYM of 6.5 dB is applied in accordance with Table 1. In an alternative embodiment, rather than loading the APHYM LUT 224a with zero values for each ARPL entry for which the associated APHYM is zero, an APHYM Threshold can be established. If the ARPL is above the ARPL Threshold, then the value of the APHYM is zero (i.e., there is no adjustment to the PHY Margin) without the processor 208 having to go to the APHYM LUT 224a.

In one embodiment of the disclosed method and apparatus, the APHYM will increase (i.e., adjust) the SNR that is required in order to use QAM modulation having a particular constellation density by 6.5 dB if the measured ARPL is −49 dB. The constellation density is the number unique states that can be represented by each symbol. Accordingly, if the SNR of 10 dB is required to receive transmissions that modulate data using 16-QAM modulation and achieve an error rate that is no greater than the desired error rate, then the required SNR would be increased to 16.5 dB. In another example, the APHYMs are applied when the ARPL is between 7 dB and −50 dB.

Figure 3:
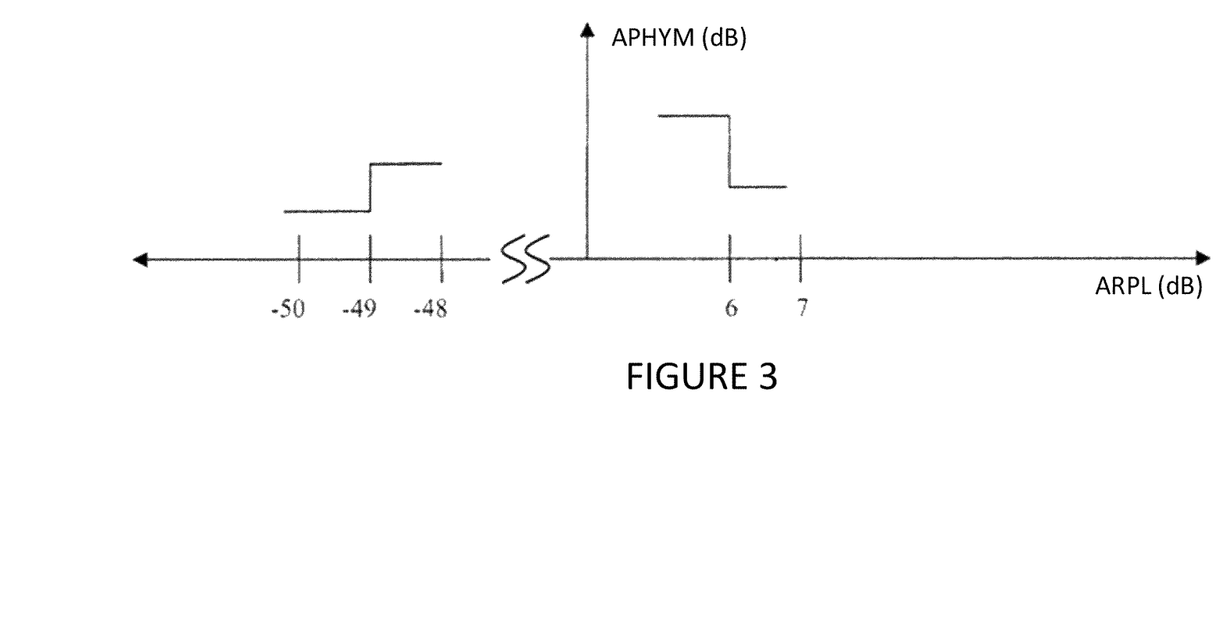
FIG. 3 is a graph illustrating one example of an additional PHY Margin values versus aggregate received power level values.

FIG. 3 is a graph illustrating one example of APHYMs versus aggregate received power level values.

TABLE 1

| ARPL/RSSI (-dB) | APHYM (dB) |
|---|---|
| 0-41 | 0 |
| 42 | 1 |
| 43 | 1.5 |
| 44 | 2.5 |
| 45 | 3.5 |
| 46 | 4 |
| 47 | 5 |
| 48 | 5.5 |
| 49 | 6.5 |
| 50 | 7.5 |
| 51 | 8 |
| 52 | 9 |
| 53 | 9.5 |
| 54 | 10 |
| 55 | 10 |
| 56 | 10.5 |
| 57 | 11 |
| 58 | 11.5 |
| 59 | 11.5 |
| 60 | 12 |
| 61 | 12.5 |
| 62 | 13 |
| 63 | 13 |
| 64 | 13.5 |
| 65 | 14 |

In another embodiment, a plurality of SAPM LUTS 224b-224f each store a plurality of SAPM values, each SAPM value associated with one subcarrier. The SAPM values may be stored in increments of 0.5 dB, starting at 0 dB and going up to a maximum of 30 dB. Additionally, the SAPM values may be applied to a subset of the subcarriers of an OFDM signal depending on an SAPM Threshold on a subcarrier by subcarrier basis. In one embodiment, each SAPM Threshold 1 through 5, defines a separate SAPM LUT 224b-224f. As shown in FIG. 2, a first SAPM LUT 224b is defined by SAPM Threshold 1, a second SAPM LUT 224c is defined by SAPM Threshold 2, etc. In accordance with one embodiment of the disclosed method and apparatus, the SAPM Thresholds have steps or increments of 0.25 dB, 0.5 dB, 0.75 dB, 1 dB. When the ARPL value of an incoming signal is at or below the SAPM Threshold, a SAPM value is applied to one or more subcarriers of an OFDM signal on a subcarrier by subcarrier basis based upon the values stored in the SAPM LUT 224b-224f associated with that particular SAPM Threshold.

Table 2, below, is an example of one particular SAPM LUT 224b in which the associated SAPM Threshold is −49 dB. In accordance with Table 2, if an OFDM signal is received having an ARPL at or below the SAPM Threshold of −49 dB, a SAPM value of 2 dB is applied to subcarriers 19-23 and 51-55 of the OFDM signal. In one embodiment of the disclosed method and apparatus, the SAPM values set forth in Table 2 are added to the PHY Margin of the specific subcarriers in addition to the 6.5 dB that is added to all of the subcarriers by the APHYM as set forth in Table 1, above. Alternatively, only the SAPM is used to adjust the PHY Margin if the ARPL is below the SAPM Threshold.

TABLE 2

SAPM Threshold = −49 dB

| Subcarrier Number | SAPM (dB) |
|---|---|
| 19 | 2 |
| 20 | 2 |
| 21 | 2 |
| 22 | 2 |
| 23 | 2 |
| 51 | 2 |
| 52 | 2 |
| 53 | 2 |
| 54 | 2 |
| 55 | 2 |

Figure 4:
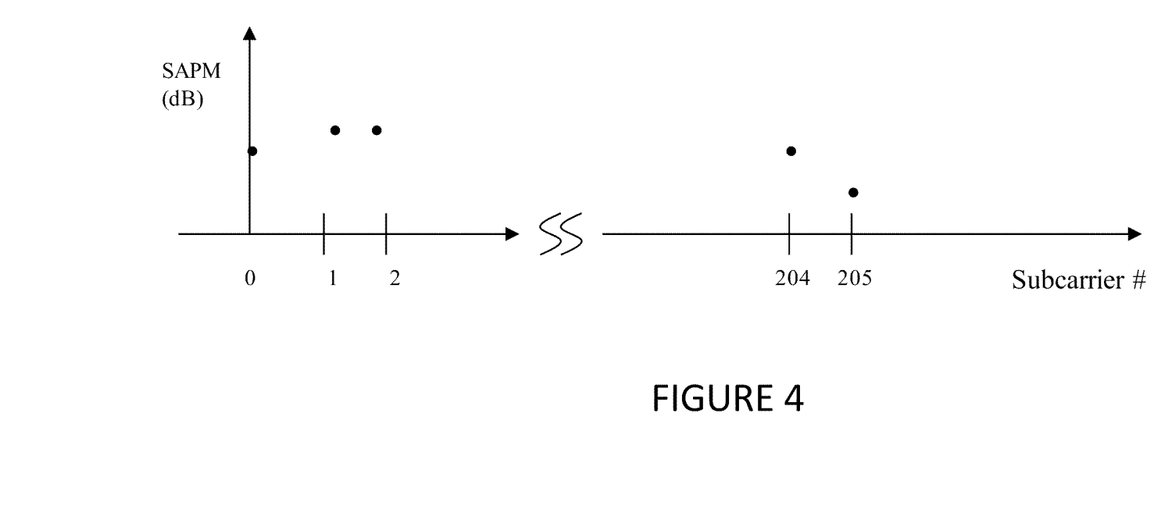
FIG. 4 is a graph illustrating one example of Subcarrier Dependent Added PHY Margin values for a plurality of subcarriers of an OFDM signal.

Table 3 below, is another example of an SAPM LUT 224c. In the SAPM LUT 224c of table 3, the SAPM Threshold is −50 dB. Accordingly, if an OFDM signal is received at a network node 200 having an ARPL at or below the SAPM Threshold (i.e., −50 dB), then a SAPM of 2 dB is added to subcarriers 212-216 and 243-247. FIG. 4 is a graphical representation of SAPM values for a plurality of subcarriers.

TABLE 3

SAPM Threshold = −50 dB

| Subcarrier Number | SAPM (dB) |
|---|---|
| 212 | 2 |
| 213 | 2 |
| 214 | 2 |
| 215 | 2 |
| 216 | 2 |
| 243 | 2 |
| 244 | 2 |
| 245 | 2 |
| 246 | 2 |
| 247 | 2 |

As described above, the APHYM and SAPM values may be applied to signals based on a calculated ARPL and/or RSSI value. Accordingly, a determination or calculation of the ARPL/RSSI value of a received probe affects the magnitude of an APHYM or SAPM that is applied to the signals transmitted between communicating network nodes 200. Thus, an accurate calculation or determination of the ARPL or RSSI of a signal should be made. One skilled in the art will understand how to achieve an accurate ARPL and/or RSSI calculation by identifying and characterizing errors in measurement of the received signal. Examples of such errors include, but are not limited to, errors associated with the frequency of the transmission and errors associated with the ambient and/or operating temperature of the system. Additionally, one skilled in the art will understand how to compensate for such errors to achieve an accurate ARPL/RSSI value.

The APHYM and SAPM, such as those set forth in Tables 1-3, are used to adjust the PHY Margin for the transmission and reception of signals transmitted between network nodes 200. In accordance with one embodiment of the disclosed method and apparatus, the adjustment is made to increase the SNR required to transmit data at each particular data transmission rate and receive that data with a desired bit error rate (BER) or packet error rate (PER). In one instance, this adjustment will mean that the transmitter will need to transmit with more power. In another instance, the adjustment will mean that the transmitter will have to transmit at a lower data transmission rate. In yet another instance, a combination of increasing the power level and decreasing the data transmission rate will be used. One way or another, an increase in the PHY Margin means that the relationship between the SNR and the data transmission rate will be altered such that lower data rates will be used for the SNR that would otherwise support a higher SNR. Alternatively stated, the expected error rate for a particular SNR and data transmission rate will be assumed to be higher when using a higher PHY Margin.

Figure 5:
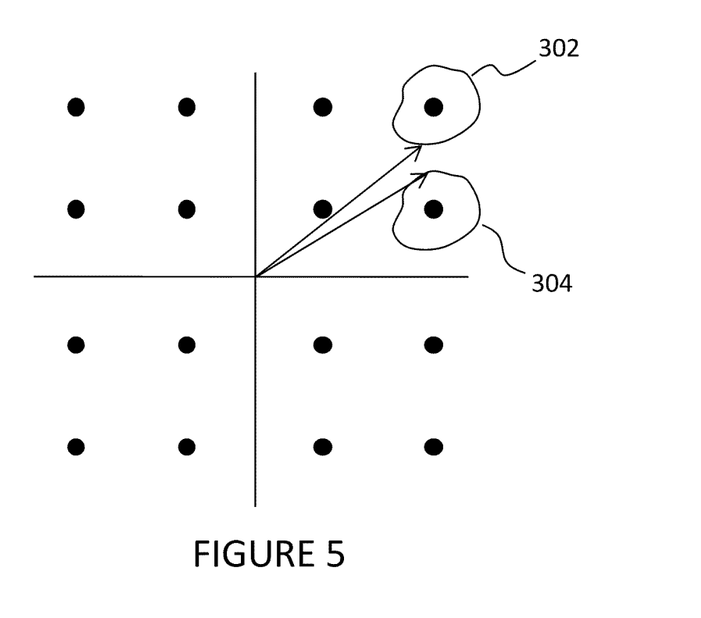
FIG. 5 illustrates one example of a 16-QAM constellation with noise associated with two subcarriers.

FIG. 5 illustrates an example of a 16-QAM constellation for a signal received through a communication channel (i.e., there are 16 states that a symbol can occupy). The shapes 302 and 304 that enclose the two states in the first quadrant represent approximations of the noise that affects those states. The distance between the noise approximations 302, 304 of the subcarriers is inversely proportional to the BER. For example, as the distance increases between the shapes 302, 304, the BER will decrease, and vice versa.

Figure 6:
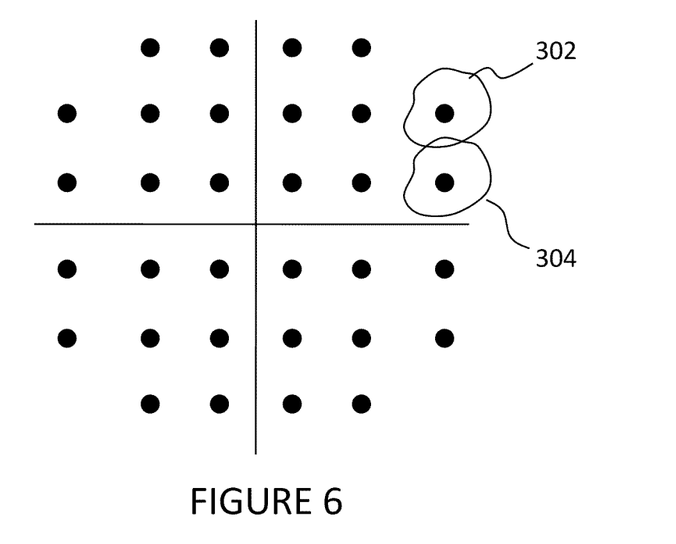
FIG. 6 illustrates one example of a 32-QAM constellation with same noise associated with two subcarriers as illustrated in FIG. 5.

FIG. 6 illustrates an example 32-QAM constellation for the same channel having the same noise approximations 302 and 304 (i.e., there are 32 states that the symbol can occupy). As shown in FIG. 6, as the density of the constellation is increased, the distance between the noise approximations decreases, i.e., the noise approximations 302 and 304 come closer together and start to intersect one another. An increase in the data transmission rate means an increase in the density of the constellation (i.e., the number of unique states that can be represented by a symbol). Consequently, the BER in FIG. 5 is lower than the BER in FIG. 6. Thus, in the example illustrated in FIGS. 5 and 6, the maximum data transmission rate that can be used is attained with 16-QAM, since the BER for 32-QAM or greater would be too high. In one embodiment, an SNR/DATA TRANSMISSION RATE LUT 224g including QAM constellation densities (e.g., 8, 16, 32, 64, 128, 256) is stored in the memory device 222. Each constellation density is associated with an SNR value determined at the nominal PHY Margin. Accordingly, the SNR values can be used as an index to determine the constellation density to be used in modulating information to be transmitted. Alternatively, the SNR value in the SNR/DATA TRANSMISSION RATE LUT 224g is the minimum SNR that will result in an acceptable error rate at the associated modulation density (i.e., prior to application of the nominal PHY Margin). Using the SNR/DATA RATE LUT 224g allows the processor 208 to select an appropriate modulation density based on an SNR value. Thus, the PHY Margin can be adjusted by calculating an index value from the SNR value prior to determining the rate from the SNR/DATA TRANSMISSION RATE LUT 224g (e.g., adding the APHYM to the SNR to calculate the index value before looking up what data transmission rate (i.e., constellation density) that index value can support).

For example, if a signal is received having an ARPL value of −42 dB, then a 1 dB APHYM may be applied in accordance with Table 1, above. Additionally, a nominal PHY Margin of 5 dB, for example, may also be applied to all signals. Accordingly, an index value would be calculated to be equal to the measured SNR+5 dB+1 dB. If the measured SNR value is 10 dB, then the index value would be 16 dB. The index value of 16 dB would then be used as an index into the SNR/DATA TRANSMISSION RATE LUT 224g to see what data transmission rate (constellation density) would be appropriate to use to ensure that the desired error rate is achieved. In one such example, the ARPL is not below any of the SAPM Thresholds (such as an ARPL of −49 dB). Therefore, no SAPM is added to the SNR value. However, if the ARPL were below one or more SAPM Thresholds, then the index value calculated from the SNR would be further adjusted prior to reference to the SNR/DATA TRANSMISSION RATE LUT 224g.

Figure 7:
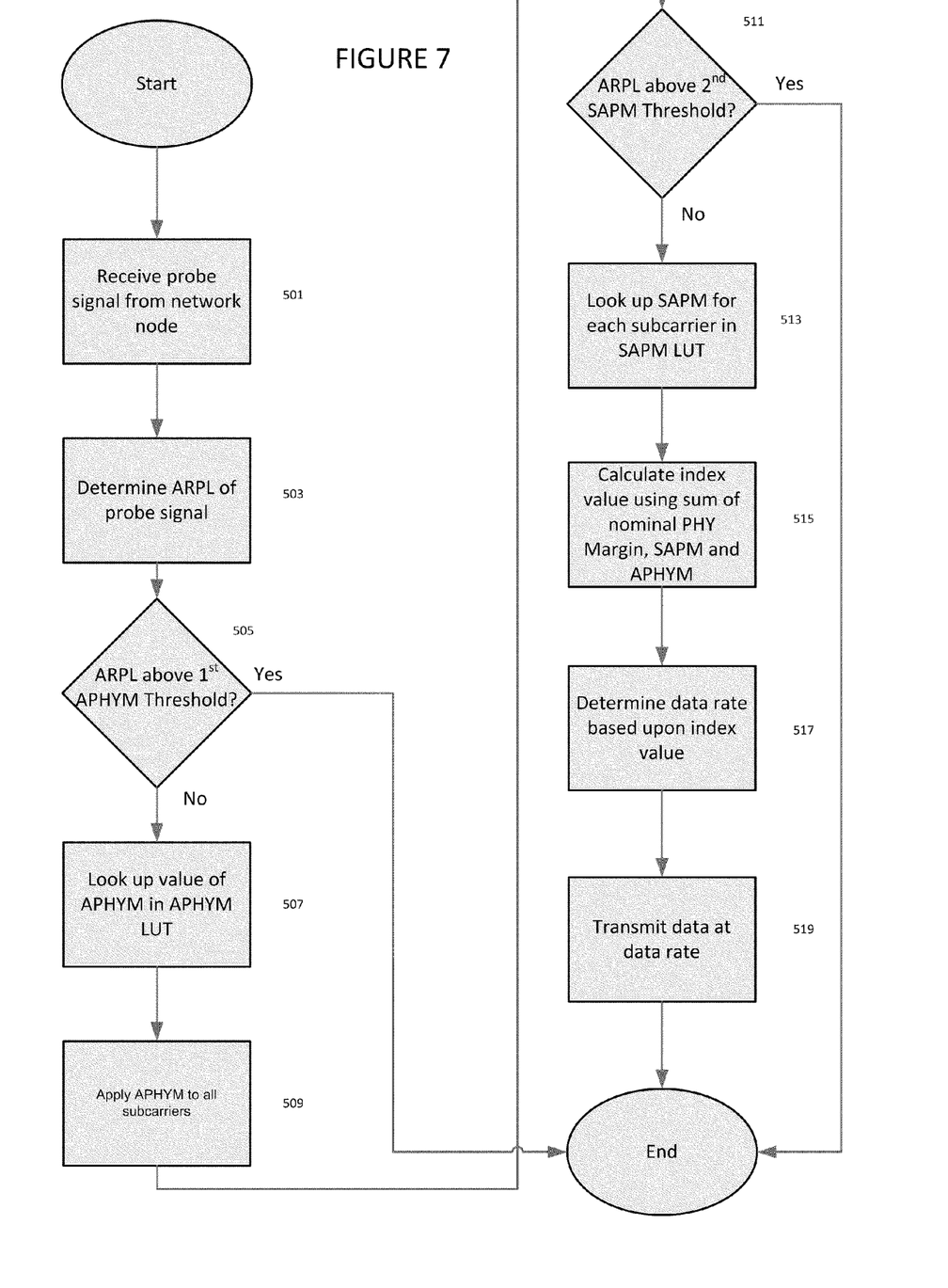
FIG. 7 is a flow diagram of one example of a method performed by the network node illustrated in FIG. 1.

FIG. 7 illustrates one example of a method of minimizing the adverse effects of sporadic noise in a communication system in which OFDM signals are transmitted. As shown in FIG. 7, a probe is received at a receiving network node (block 501). In one embodiment, the probe is a signal that includes known data packets or sequences used to characterize the transmission channel. The receiving node measures the ARPL. That is, the ARPL is determined by the processor 208 from information provided by the transceiver 202. In one embodiment, the processor 208 determines the ARPL simply by receiving the ARPL from the transceiver 202. Alternatively, the transceiver 202 provides information from which the processor 208 determines the ARPL. In one embodiment, the ARPL is measured for the entire bandwidth of the OFDM signal. Alternatively, the ARPL is measured both for each subcarrier of the probe and for the entire bandwidth of the OFDM signal (block 503). In one embodiment, the ARPL and/or RSSI value are based on the SNR of each of the subcarriers as described above (block 504).

If the APLM is above the APHYM Threshold, then no adjustment is made to the nominal PHY Margin and the process ends (block 505). However, if the APLM is below the APHYM Threshold (block 505), then the processor 208 will refer to the LUT 224 to determine the value of the APHYM (block 507). The APHYM is then applied equally to all of the subcarriers in the OFDM signal. That is, the APHYM is added to the nominal PHY Margin to create a new PHY Margin to be used by all of the subcarriers in the OFDM signal (block 509).

Next, the ARPL is used to select a SAPM LUT 224a-224f that indicates the particular SAPM to be used with each subcarrier. Several such SAPM LUTs 224b-224f may coexist, each associated with a different SAPM Threshold and having a different subset of subcarriers listed therein. Alternatively, some or all of the SAPM LUTs 224b-224f have the same set (or subset) of subcarriers listed therein, but different values for the SAPM.

In one embodiment of the disclosed method and apparatus, each LUT 224 associated with an SAPM Threshold that is greater than the measured ARPL is used to determine what SAPM to the PHY Margin to apply to each particular subcarrier. As noted, there may be several SAPM Thresholds, each of which has a unique SAPM LUT 224 in which each relevant subcarrier is associated with a SAPM that is to be added to the APHYM and any nominal PHY Margin to determine the particular PHY Margin to be used for that particular subcarrier. In one embodiment, each subcarrier can only be listed in one such SAPM LUT. However, in an alternative embodiment, when a particular subcarrier appears in more than one such LUT 224, the LUT 224 associated with the lowest SAPM Threshold will determine the SAPM value to be used for that subcarrier. The processor 208 looks up the LUTs 224 to determine whether to apply a SAPM and what the value of such an SAPM should be (block 513).

Next, for each subcarrier, the sum of the nominal PHY Margin, the APHYM and the SAPM associated with each subcarrier is calculated and added to the SNR of the channel (block 515) to calculate an index value. That index value is used as an index to determine what data transmission rate will be acceptable for communication of information over the channel (block 517). Data is then transmitted at the determined data transmission rate (block 519).

In addition to the above described embodiments, the disclosed method and system may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, flash memory drives, Blu-ray ROMS, or any other computer-readable storage medium, wherein, when the computer program code is loaded into and executed by a computer, the computer becomes an apparatus for practicing the disclosed method and system. The present disclosed method and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A method, comprising:
a) determining, by a first network node, a received power level of an Orthogonal Frequency Division Multiplexed (OFDM) signal received, over a channel, at the first network node;
b) adjusting a Physical Layer (PHY) Margin based on the received power level, wherein adjusting the PHY Margin comprises: determining whether the received power level is lower than at least one Subcarrier Added PHY Margin (SAPM) Threshold; c) if the received power level is lower than at least one SAPM Threshold, then determining a SAPM for at least one subcarrier based on a lowest SAPM Threshold that is greater than the received power level;
d) determining a signal to noise ratio (SNR) of the channel;
e) adding the determined SAPM to the SNR to determine an index value on a subcarrier by subcarrier basis; and
f) using the index value to determine a data transmission rate that is acceptable for communication of information over the channel to be used on a subcarrier by subcarrier basis.

2. The method of claim 1, wherein adjusting the PHY Margin comprises:
a) determining whether the received power level is below an Additional Physical Layer Margin (APHYM) Threshold; and
b) adjusting the PHY Margin only if the received power level is below the APHYM Threshold.

3. The method of claim 1, wherein determining the data transmission rate comprises:
a) determining a signal to noise ratio (SNR) of the received OFDM signal;
b) calculating an index value by adding or subtracting a predetermined amount to the SNR as indicated by the adjusted PHY Margin; and
c) using the index value as an index to determine the data transmission rate.

4. The method of claim 1, wherein determining the data transmission rate comprises:
   a) determining an SNR of the received OFDM signal;
   b) using the SNR as an index to determine a data transmission rate; and
   c) adjusting the data transmission rate an amount indicated by the adjusted PHY Margin.

5. The method of claim 4, wherein there are a plurality of SAPM Thresholds, each SAPM Threshold associated with a subset of subcarriers and indicating a SAPM for each such subcarrier in the subset.

6. The method of claim 5, wherein at least one subcarrier is associated with more than one SAPM Threshold and wherein the SAPM to be used to adjust the PHY Margin for that subcarrier is indicated by the SAPM Threshold that is higher than the received power level and that has the lowest value from among all other SAPM Thresholds associated with the same subcarrier.

7. The method of claim 1, wherein determining the data transmission rate comprises:
   a) determining a SNR for the received OFDM signal;
   b) using the SNR as an index to determine a data transmission rate; and
   c) communicating that the transmitter must transmit at the data transmission rate with higher power than was used to transmit the received OFDM signal, the amount of the power increase being determined by the adjusted PHY Margin.

8. The method of claim 1, wherein determining the data transmission rate comprises:
   a) determining the SNR for the received OFDM signal;
   b) calculating an index value using the SNR based on the adjusted PHY Margin;
   c) using the index value to determine the data transmission rate; and
   d) communicating to a transmitting node the data transmission rate and also communicating to the transmitting node that the power level of the transmission at the data transmission rate should be above the power level used to transmit the received signal, the amount of the increase in power level being determined based on the adjusted PHY Margin.

9. The method of claim 1, wherein amount of the adjustment to the PHY Margin is retrieved from a look-up table.

10. The method of claim 9, wherein the look-up table includes a plurality of PHY Margin values, each of the plurality of PHY Margin values associated with a received power level.

11. The method of claim 1, wherein the received power level is an aggregated receive power level (ARPL).

12. The method of claim 1, wherein the received power level is a received signal strength indicator (RSSI).

13. The method of claim 1, wherein the PHY Margin amount indicated by the SAPM for a first subcarrier is different than the PHY Margin amount indicated for a second subcarrier.

14. A network node, comprising:
   a) a transceiver configured to receive an Orthogonal Frequency Division Multiplexed (OFDM) signal over a channel; and
   b) a processor in a signal communication with the transceiver, the processor configured to:
      i) determine a received power level of the received OFDM signal;
      ii) adjust a Physical Layer (PHY) Margin based on the received power level, wherein adjusting the PHY Margin comprises: determining whether the received power level is lower than at least one Subcarrier Added PHY Margin (SAPM) Threshold; iii) if the received power level is lower than at least one SAPM Threshold, then determining a SAPM for at least one subcarrier based on a lowest SAPM Threshold that is greater than the received power level;
      iv) determining a signal to noise ratio (SNR) of the channel; v) adding the determined SAPM to the SNR to determine an index value on a subcarrier by subcarrier basis; and
      vi) using the index value to determine a data transmission rate that is acceptable for communication of information over the channel to be used on a subcarrier by subcarrier basis.

15. The network node of claim 14, wherein the processor adjusts the PHY Margin by:
   a) comparing the received power level with an Additional Physical Layer Margin (APHYM) Threshold;
   b) if the received power level is greater than the APHYM Threshold, then adjusting the PHY Margin by an amount determined by using the received power as an index into an APHYM look up table (LUT).

16. The network node of claim 15, wherein the processor determines the data transmission rate by:
   a) determining a signal to noise ratio (SNR) of the channel;
   b) adding the amount determined from the APHYM LUT to the SNR to determine an index value; and
   c) using the index value as an index into an SNR/DATA TRANSMISSION RATE LUT to determine the data transmission rate.

17. The network node of claim 14 wherein using the index value to determine the data transmission rate comprises using the index value as an index into a SNR/DATA TRANSMISSION RATE LUT.

18. The network node of claim 14, wherein the processor is configured to retrieve a value of the second PHY Margin from a look-up table that is in data communication with the processor.

19. The network node of claim 18, wherein the look-up table includes a plurality of PHY Margin values, each of the plurality of PHY Margin values associated with an aggregate received power level.

20. The network node of claim 14, wherein the data transmission rate is based on a quadrature amplitude modulation (QAM) scheme.

21. The network node of claim 14, wherein the processor is configured to select a second PHY Margin value from a plurality of PHY Margin values stored in a memory device based on the second signal power level.

22. The network node of claim 21, wherein the OFDM signal includes a plurality of subcarriers, and wherein the first and second PHY Margins are applied to each of the plurality of subcarriers of the OFDM signal.

23. The network node of claim 22, wherein first PHY Margin is different from second PHY Margin.

* * * * *